Patented Oct. 20, 1931

1,827,755

UNITED STATES PATENT OFFICE

GUSTAF NEWTON KIRSEBOM, OF GOTTENBORG, SWEDEN

TREATMENT OF CADMIUM-BEARING MATERIAL

No Drawing. Application filed June 28, 1930. Serial No. 464,716.

This invention relates to the treatment of cadmium-bearing material, and has for its object certain improvements in the method of treating cadmium-bearing material. The invention relates more particularly to the recovery of cadmium from cadmium-bearing material, either alone or as an alloy with other metals.

In my copending applications, Serial No. 293,709, filed July 18, 1928, and Serial No. 377,065, filed July 9, 1929, I have disclosed the treatment of metallic compounds with arsenic trioxide and metallic arsenic, respectively, in the presence of a suitable alkali metal compound, such as caustic soda, in order to recover the metals. The processes relate more particularly to the treatment of lead oxide alone or in admixture with other metallic oxides whereby lead or alloys of lead are recovered. The present application relates more especially to the treatment of cadmium-bearing material in order to recover the cadmium as such or as an alloy of other metals. While a number of processes have been proposed to treat cadmium-bearing material for the recovery of its cadmium content, these processes do not appear to be satisfactory because of their complexity, high cost, and poor recoveries.

Cadmium-bearing material accumulates as a by-product in relatively large quantities in the treatment of various other metals. Such sources as the following may here be considered:

Cadmium-bearing material in relatively large quantities is produced in the operation of both lead and copper plants, in the form of cadmium-bearing dust. The cadmium is usually present in the form of finely divided metallic particles, as an oxide, sulfide, sulfate, oxysulfate and the like, or as an admixture of two or more of these forms.

Appreciable quantities of cadmium-bearing material are also obtained in the electrolytic treatment of zinc, such as in the purification of zinc sulfate solutions during the electrolysis of zinc; or in electrolytic processes of zinc reduction. This cadmium-bearing material consists mainly of cadmium-copper residues, obtained by treating the zinc electrolyte with zinc dust which is adapted to precipitate basic metals, including cadmium and copper, and sometimes lead. Cadmium-copper sludge with an excess of zinc is produced. Most of the zinc is removed and a second sludge rich in cadmium and copper is produced. In the purification of zinc sulfate solutions for the production of lithopone, zinc dust is also added and a similar cadmium-bearing precipitate is often obtained.

Whenever cobalt is present in the zinc electrolyte, it proves exceedingly harmful to the electrolysis process, and every trace of the cobalt should be removed. One of the best ways of removing the cobalt consists in adding arsenic, for example, in the form of arsenic trioxide, to the impure zinc solution, when the arsenic will dissolve as arsenic sulfate. During the subsequent purification step with zinc dust, metallic arsenic is thrown down along with the cobalt, cadmium and copper. Practically all of the cobalt may be removed in this way. The resulting sludge lends itself readily to the treatment of the process of the invention herein contemplated, particularly since the sludge already contains appreciable amounts of metallic arsenic.

Additional cadmium-bearing material is made available in the treatment of certain radium-bearing material, when a residue is obtained containing the cadmium mostly in the form of a sulfide and chloride. In the retort reduction of zinc ores, a dust is initially driven off that is relatively rich in cadmium content. Most zinc ores are contaminated with cadmium, and a substantial part of the cadmium content may be recovered in the form of a collected dust. Cadmium-bearing material from other sources may of course be used in the practice of the present invention.

As a result of my investigations, I have determined that cadmium-bearing material may be treated in the presence of a suitable caustic alkali metal compound and arsenic, either as metallic arsenic or as a compound of the same such as arsenic trioxide, or both, to recover the cadmium. Thus, the cadmium-bearing material may be subjected to the action of metallic arsenic or arsenic trioxide or both in the presence of molten caustic soda. If the cadmium is present in the cadmium-bearing material as an oxide, or as a sulfide, the reactions may be indicated as follows:

(1) $5CdO + 2As + 6NaOH \rightarrow 5Cd + 2Na_3AsO_4 + 3H_2O$
(2) $5CdS + 2As + 16NaOH \rightarrow$
$5Cd + 2Na_3AsO_4 + 5Na_2S + 8H_2O$
(3) $2CdO + As_2O_3 + 6NaOH \rightarrow 2Cd + 2Na_3AsO_4 + 2H_2O$
(4) $2CdS + As_2O_3 + 10NaOH \rightarrow$
$2Cd + 2Na_3AsO_4 + 2Na_2S + 5H_2O$ A glance at the equations indicated will show that the cadmium-bearing material, whether an oxide or a sulfide of cadmium, or both, is reduced by the arsenic or compound of arsenic in the presence of an alkali metal compound, such as caustic soda. When treating an oxide of cadmium, the reaction results in metallic cadmium and sodium arsenate. If cadmium sulfide is treated, the reaction likewise results in metallic cadmium and sodium arsenate, sodium sulfide being formed in addition. The two types of reactions may undoubtedly take place at the same time, provided both compounds of cadmium are present during the treatment operation.

No cadmium compound appears to be soluble in caustic soda. If the chloride, sulfate, hydroxide, or any other compound of cadmium, other than the sulfide of cadmium, is immersed in a molten bath of caustic soda, cadmium oxide is formed which is found in suspension in the caustic soda. Cadmium sulfide appears not to be affected in the presence of fused caustic soda. Representative reactions of this kind may be indicated as follows:

(5) $CdCl_2 + 2NaOH \rightarrow$
$CdO + 2NaCl + H_2O$ (6) $CdSO_4 + 2NaOH \rightarrow$
$CdO + Na_2SO_4 + H_2O$ If cadmium chloride, for example, is admixed with fused caustic soda, cadmium oxide is formed as well as sodium chloride. If cadium sulfate, on the other hand, is treated with fused caustic soda, cadmium oxide is again formed, and also sodium sulfate. Thus, it is found that in a caustic soda melt the cadmium is always present either as an oxide or the sulfide. It differs in this respect very sharply from such metals as antimony and tin, which form antimonates and stannates. A corresponding compound of cadmium is not formed under similar conditions. In the case of the treatment of such compounds as cadmium oxide or cadmium sulfide, or both, by means of arsenic, or a suitable compound of arsenic, such as arsenic trioxide, the reaction appears to be one in which a solid body reacts with another in the presence of a body of fused caustic soda.

The process may be carried out in ordinary cast iron melting pots in which is charged an intimate mixture of arsenic and the cadmium-bearing material to be treated, together with caustic soda in granulated or flaked form; and with subsequent heating of the mixture. For the sake of simplicity, the arsenic employed, whether metallic arsenic or a compound of arsenic, such as arsenic trioxide, or a combination of the two forms of arsenic, will hereinafter be referred to as arsenic, it being understood that the word "arsenic" is to cover broadly any form of arsenic suitable for the treatment operation contemplated in the practice of the process of the invention.

The process may also be carried out by melting solid caustic soda to form a molten bath and then introducing into the molten bath an intimate mixture of the arsenic with the cadmium-bearing material; or, the arsenic may be added to a mixture of caustic soda and the cadmium-bearing material to be treated.

Caustic soda baths or slags containing cadmium may be subjected to the present process by adding suitable amounts of arsenic thereto. Whichever procedure is followed, it should be remembered that arsenic is highly reactive and that, unless the metal compounds to be treated are present when the arsenic reacts with the caustic soda, the available reducing power is not fully utilized.

The temperature at which the process is carried out to effect the treatment of the cadmium-bearing material may be varied. It should be above the melting point of the caustic soda, and in general a temperature above that of the melting point of the cadmium compound to be treated should not be employed. Temperatures up to around 400° C. or higher have been utilized. When the intimate mixture is made and then heated to form a fused bath, the melting is accompanied with an ebullition due to the escape of steam during the reaction, but without loss of metal oxides by dusting. The reaction takes place rapidly when the proper temperature is reached.

After the reduction of the cadmium-oxide present in the material has taken place, the reduced cadmium may be drawn off in a molten form from the bottom of the melting pot through a suitable discharge outlet. The cadmium may be cast into suitable forms, or it may be mixed with other suitable metals. The fused bath of slag remaining will contain the sodium arsenate. It may be granulated with water or run into molds and then dissolved in water in an iron tank. This slag also contains an excess of caustic soda.

The cadmium-bearing material to be treated may also be mixed with caustic soda, and placed upon a molten bath of lead. Arsenic in suitable amounts is then added in stages to effect the reduction of the cadmium oxide or other compounds of cadmium to metallic cadmium; as well as the reduction of other metallic oxides, if present. When proceeding in accordance with the process just outlined, it is preferable thoroughly to stir the reactive ingredients, thus insuring an intermingling of the lead bath with the caustic material containing the reduced cadmium; and to further the solution of the cadmium in the lead. The resulting cadmium-lead alloy may be suitably separated from the spent caustic soda slag.

In accordance with the practice of the present invention, it is also possible to effect the treatment of cadmium-bearing material to obtain cadmium alloyed with one or more other metals, such as bismuth, antimony, tin, etc. Thus, if the cadmium-bearing material contains bismuth or a compound or bismuth, the mixture may be treated in accordance with the process of the invention and a cadmium-bismuth alloy is obtainable. In fact, if it is desired to obtain a cadmium alloy, and the cadmium-bearing material itself does not contain the other alloy metals, appropriate metal-bearing material may be added to the reaction mass; such metal material may be either in the metallic or compound form, or both. The process is of course also applicable to the treatment of alkali metal, such as caustic soda, slags and the like, containing cadmium or cadmium in conjunction with one or more other metals; such as lead, antimony, bismuth, tin, etc.

Metallic arsenic to be employed in the practice of the invention may, for example, be obtained either as native arsenic from mines, or by roasting arsenical pyrites with the exclusion of air. Blast furnace dust from lead furnaces, which often contain large amounts of metallic arsenic, may advantageously be employed in the practice of the invention. In such case the furnace flue dust may be added to the bath of caustic soda containing the cadmium-bearing material to be treated.

In some instances, the cadmium-bearing material will, in the first instance, contain appreciable amounts of arsenic and/or arsenic trioxide. In case the material to be treated is deficient in arsenic trioxide, a sufficient amount of arsenic trioxide and/or arsenic may be added from other sources.

By way of specific illustration of the practice of the invention, the following example may advantageously be considered. An original unroasted cadmium-bearing flue dust of the following analysis was employed:

Moisture 6.2%.

*Analysis at 100° C.*

|  | Per cent |  | Per cent |
|---|---|---|---|
| Cd | 20.49 | CdO | 23.41 |
| Pb | 8.47 | PbO | 9.12 |
| $SiO_2$ | .55 | $SiO_2$ | .55 |
| Fe | .25 | $Fe_2O_3$ | .36 |
| S | .99 | S | .99 |
| Zn | 1.26 | ZnO | 1.57 |
| CaO | 1.80 | CaO | 1.80 |
| Cu | trace | Cu | trace |
| As (tota) | 56.2 | As (total) | 56.2 |
| As ($As_2O_3$) | 8.59 | $As_2O_3$ | 11.34 |
| As (Met) | 47.61 | As (Met) | 47.61 |

A roasted cadmium-bearing flue dust having the following analysis was also used:

|  | Per cent |
|---|---|
| Cd | 30.45 |
| Pb | 12.04 |
| As (total) | 21.84 |
| As ($As_2O_3$) | 0.60 |
| As ($As_2O_5$) | 21.24 |

Tests were made on a mixture of the two kinds of cadmium-bearing material, consisting of 260 pounds of the original unroasted flue dust and 400 pounds of the roasted flue dust. This mixture or blend itself provided the theoretical amount of metallic arsenic and arsenic trioxide, together with a sufficient excess required to carry on the treatment operation. In the absence of an adequate amount of the arsenic with the starting materials, a sufficient excess is provided from other sources. The mixture in question gave the following analysis:

|  | Per cent |
|---|---|
| Cd | 26.12 |
| Pb | 11.40 |
| As ($As_2O_3$) | 2.79 |
| As ($As_2O_5$) | 12.87 |
| As (Met) | 16.10 |

576 pounds of the mixture were carefully fed into a cast iron pot containing 665 pounds of molten caustic soda maintained at a temperature of about 500° C. In the instant case, the caustic soda mixture was permitted to rest upon a molten bath of 25 tons of pure lead. The contents were stirred with a ladle for approximately 4¼ hours.

The metallic portion separated from the resulting slag amounted to 56165.5 pounds of metal, analyzing 0.249% cadmium; the remainder being lead. 139.85 pounds of cadmium were obtained in the lead alloy, which represents a recovery of 93.0% of the available cadmium.

On leaching the caustic slag separated from the metallic portion, a residue, crystals and mother liquor were obtained. The residue amounted to 206.5 pounds and analyzed as follows:

|  | Per cent |
|---|---|
| Cd | 1.08 |
| Pb | 18.05 |

| | Per cent |
|---|---|
| Fe | 1.57 |
| Zn | 2.32 |
| S | 1.85 |
| SiO$_2$ | 7.51 |
| As | 9.65 |
| Cu | 0.05 |
| Sb | 0.22 |
| CaO | 8.26 |

The cadmium in the residue, on the other hand, represented 1.55% of the total.

The crystals obtained as a result of leaching the caustic slags amounted to 1224 pounds, which analyzed as follows:

| | Per cent |
|---|---|
| Free NaOH | 10.11 |
| As | 12.65 |
| Pb | 0.88 |
| Zn | 0.08 |
| Cd | none |

The mother liquor amounted to 568 pounds, and analyzed as follows:

| | Grs. per liter |
|---|---|
| Free NaOH | 259.3 |
| As | 1.5 |
| Pb | 19.66 |
| Zn | 1.35 |
| Sb | 0.35 |
| CO$_2$ | 19.12 |
| SiO$_2$ | 3.40 |

A study of the analyses just set out will readily indicate that substantially all of the cadmium originally available may be recovered with the metallic portion separated from the slag. A very small amount goes into the residue, but none is found in the crystals or in the mother liquor.

Any suitable apparatus may be employed in which to conduct the treatment process of the operation. For example, I have employed an ordinary cast iron pot, mounted on brickwork, which is heated with a gas or oil burner. The pot has a cover to which is attached a stirrer, the shaft of which extends into the pot. The cover contains two openings, one for the feeding of the charge material to the pot and another for the escaping steam. The feeder hole is connected with a screw conveyor that feeds the material into the pot from a storage bin during the operation. To catch escaping dust and the like, the exhaust hole may be connected with a baghouse.

When operations are to start, the caustic soda is fed into the pot and heated to a temperature ranging between 400 and 500° C., depending on the nature of the cadmium-bearing material. Cadmium sulfide usually requires a higher temperature than cadmium oxide. The cover is lowered over the pot and connection made with the feeder and the exhaust pipe. The stirrer is set in motion with a speed depending upon the material to be treated, for example, 150 revolutions per minute. A mixture of the cadmium-bearing material is then introduced into the pot by means of the screw conveyor, and arsenic or arsenic trioxide, in a proportion to insure reduction of the cadmium and other metals present reducible by arsenic, such as lead, cadmium and the like, is added thereto.

The mixture is fed into the pot, regularly, with a speed corresponding to the time necessary for completion of the reaction, which varies with the quantity of the charge and the nature of the material. After the reaction is finished, the cover is removed and the slag is withdrawn. As the metal is readily oxidizable from the surface, a little slag is left on top, and a certain amount of fresh caustic soda is added, whereupon the cover is again lowered and the stirrer set in motion. The treatment with fresh caustic soda is necessary to remove from the molten metal small amounts of arsenic which have been drawn into it during the reaction. When enough stirring has been accomplished to remove all the arsenic in the metal, the new slag and the metal are separately withdrawn from the reaction vessel. The new slag may advantageously be returned to the pot for the next operation.

The resulting alloy of cadmium with other metals, such as lead, bismuth, etc. is then advantageously charged into a distilling furnace of the Fabre du faure type, where about 85-90% of the contained cadmium can usually be removed in the form of a 99.9% product.

The residual cadmium left in the slag residues may be removed, either by treating it with caustic soda and an oxidizer, such as sodium nitrate, which oxidizes the cadmium to cadmium oxide, or the cadmium may be removed by treatment of the molten residue with lead chloride, when the cadmium is recovered as cadmium chloride.

After the cadmium has been removed from the caustic slag, the slag may be treated for the regeneration of caustic soda.

Where metallic arsenic is readily available, such as in blast furnace dust, the slag may be lixiviated with water, and the arsenic-bearing material added thereto as a result of which sodium arsenite is formed, according to the following reaction:

(7) $3Na_3AsO_4 + 2As + 6NaOH \rightarrow 5Na_3AsO_3 + 3H_2O$

The resulting sodium arsenite solution may advantageously be employed as a weedkiller.

When lixiviating the caustic slag, it is always found that no cadmium has gone into solution. The remaining cadmium is always present in the insoluble residue after the lixiviation.

When a material containing cadmium in finely divided form is fed into a molten caustic bath, it is practically at once oxidized on the surface to oxide, showing that it is not possible to melt such cadmium under a caustic soda cover.

In the treatment of a cadmium copper sludge, analyzing as follows:

Cd 3.22%, Cu 0.2%, Zn 78.20%, Pb 1.21% (from zinc dust precipitate), Fe 1.78%, $SO_3$ 11.11%, rest oxygen, which was treated with dilute sulfuric acid countercurrently, until a residue was obtained containing:

42.5% Cd, 20.3% Pb, 11.2% Zn, 4.8% Cu, rest silica lime and carbonaceous matter.

In accordance with the practice of the present invention, 95% of the contained cadmium was recovered in the alloy formed, which consists of cadmium, lead and copper.

From what has been said above, it will be apparent that the present invention lends itself readily to various ways of treating cadmium-bearing material to recover its cadmium content; either alone, as metallic cadmium, or as an alloy with one or more other metals.

I claim:

1. The method of treating cadmium-bearing material which comprises causing the cadmium-bearing material to react with arsenic in the presence of a fused caustic alkali metal compound whereby the cadmium compound present in the material is reduced to metallic cadmium, and separating the resulting metallic cadmium from the alkali metal slag.

2. The method of treating cadmium-bearing material containing cadmium as cadmium oxide which comprises causing the cadmium oxide to react with arsenic in the presence of a fused caustic alkali metal compound whereby the cadmium oxide is reduced to metallic cadmium, and separating the resulting metallic cadmium from the alkali metal slag.

3. The method of treating cadmium-bearing material containing one or more metal compounds other than cadmium which comprises causing the cadmium and metal compounds present in the material to react with arsenic in the presence of a fused caustic alkali metal compound whereby the cadmium compound and other metal compounds are reduced to metallic cadmium and one or more of the other metals, and separating the resulting cadmium alloy from the alkali metal slag.

4. The method of treating cadmium-bearing material containing the oxides of cadmium and lead which comprises causing the oxides of cadmium and lead to react with arsenic in the presence of fused caustic soda whereby the cadmium oxide and lead oxide are reduced to metallic cadmium and lead, and separating the resulting cadmium and lead alloy from the caustic soda slag.

5. The method of treating cadmium-bearing material containing cadmium as cadmium sulfide which comprises causing the cadmium sulfide to react with arsenic in the presence of a fused caustic alkali metal compound whereby the cadmium sulfide is converted to metallic cadmium, and separating the resulting metallic cadmium from the alkali metal slag.

6. The method of treating cadmium-bearing material containing cadmium as cadmium oxide and cadmium sulfide which comprises causing the cadmium oxide and the cadmium sulfide to react with arsenic in the presence of a fused caustic alkali metal compound whereby the cadmium oxide and the cadmium sulfide are converted to metallic cadmium, and separating the metal from the alkali metal slag.

7. The method of treating cadmium-bearing material in the form of a sludge obtained in the purification of zinc sulfate liquors which comprises bringing the sludge and arsenic into reactive relation in the presence of fused caustic soda, said arsenic being present in amount sufficient to effect the conversion of the cadmium compounds present in the sludge to metallic cadmium, and separating the resulting cadmium-bearing alloy from the caustic soda slag.

8. The method of treating cadmium-bearing material in the form of a cadmium-copper sludge which comprises bringing the cadmium-copper sludge into reactive relation with arsenic in the presence of fused caustic soda, said arsenic being present in amount sufficient to effect the conversion of the cadmium compounds present in the sludge, and separating the resulting cadmium-bearing alloy from the caustic soda slag.

9. The method of treating cadmium-bearing material which comprises causing the cadmium-bearing material to react with arsenic in the presence of a fused caustic alkali metal compound, separating a substantial portion of the resulting slag from the molten metal produced, adding further amounts of alkali metal compound to the reaction mixture to remove arsenic from the metal portion, and separating the final slag from the substantially arsenic-free metal portion.

10. The method of treating cadmium-bearing material in the form of compounds of cadmium in admixture with compounds of lead, which comprises causing the compounds of cadmium and lead to react with arsenic in the presence of fused caustic soda whereby the compounds of cadmium and lead are converted to metallic cadmium and lead, and separating the resulting cadmium and lead alloy from the caustic soda slag.

11. The method of treating cadmium-bearing material which comprises bringing a molten lead and fused caustic soda and arsenic mixture into reactive relation, said arsenic being present in amount sufficient to effect the conversion of the cadmium compounds, said mixture being thoroughly stirred to obtain an intimate admixture of the same, and separating the resulting cadmium-lead alloy from the caustic soda slag.

12. The method of treating cadmium-bearing material in the form of caustic soda slag obtained in the purification of lead, which comprises bringing the cadmium-bearing caustic soda slag into reactive relation with arsenic and caustic soda in amount sufficient to effect the conversion of the cadmium compounds to metallic cadmium, and separating the resulting metal from the caustic soda slag.

13. The method of treating cadmium-bearing material containing an appreciable amount of arsenic which comprises bringing the material with the arsenic into reactive relation with molten caustic soda at a temperature adapted to convert cadmium compounds present in the material to metallic cadmium.

14. The method of treating cadmium-bearing material containing an appreciable amount of arsenic which comprises bringing the cadmium-bearing material together with the arsenic into reactive relation with molten caustic soda, and causing a sufficient amount of arsenic to be introduced to the reaction mass to insure the conversion of cadmium compounds present in the material to metallic cadmium.

15. The method of treating cadmium-bearing materials containing appreciable amounts of arsenic which comprises blending the cadmium-bearing materials to obtain a predetermined arsenic content, and bringing the blended cadmium-bearing material into reactive relation with molten caustic soda whereby cadmium compounds present in the reaction mass are converted to metallic cadmium.

In testimony whereof I affix my signature.
GUSTAF NEWTON KIRSEBOM.